United States Patent Office 3,046,146
Patented July 24, 1962

3,046,146
THERMOSETTING MATERIAL
James Seward Woodhead, 24 Tedder Road, Tunbridge Wells, Kent, England, and John Edward Worthington, 54 Old Hadlow Road, Tonbridge, Kent, England
No Drawing. Filed June 8, 1959, Ser. No. 818,558
Claims priority, application Great Britain June 12, 1958
24 Claims. (Cl. 106—38.5)

The invention relates to thermosetting compositions both liquid and solid derived from the reaction between two groups of naturally occurring substances.

The present invention relates to a series of resinous thermosetting compositions formed from the reaction between members of a series of compounds known as carbohydrates, most of which are naturally occurring, and a group of chemical or physical extracts of wood, known collectively as tanning materials. The composition may be solid or liquid.

The process is susceptible to numerous variations in the quantities and character of the ingredients involved, and these variations in the process produce products of different characteristics which have various uses in the arts. Any examples given below are not intended to limit the invention in any way.

The reaction is favoured by the application of heat, and is brought about by the addition of a small proportion of aniline or other amines.

A carbohydrate is defined for the purposes of this invention as a compound selected from the group consisting of monosaccharides e.g. glucose, fructose, disaccharides, e.g. sucrose, maltose, hydrolysed polysaccharides, e.g. hydrolysed starch or cellulose, substituted compounds of the foregoing, e.g. glycosides, and polyhydroxyl alcohols containing at least 3 carbon atoms, e.g. glycerol, sorbitol.

For the purpose of the invention tanning materials may be defined as a chemical extract or a physically disintegrated powder of woods of which the following are typical examples.

Hydrolysable:
(1) Chestnut—bark, wood, leaves, twigs of Castanea sp. (Fagaceae).
(2) Myrobolans—fruit of *Terminalia chebula* (Combretaceae).
(3) Valonia—acorn cups of *Quercus aegilops* (Fagaceae).
(4) Oak—wood of Quercus sp. (Fagaceae).
(5) Sumach—leaves of *Rhus coriaria* and other sp. (Anacardiaceae).
(6) Divi-divi—pods of *Caesalpinia coriari* (Leguminosae).

Condensed:
(7) Quebracho—wood of *Schinopsis lorentzii* (Anacardiaceae).
(8) Mimosa (wattle)—bark of *Acacia mollissima* (Leguminosae).
(9) Mangrove (Borneo cutch—bark Rhizophoraceae. Various species.
(10) Spruce—bark of *Picea abies* (Pinaceae).
(11) Hemlock—bark of *Tsuga canadensis* (Pinaceae.)
(12) Gambier—leaves and twigs of *Unicaria gambia* (Rubiaceae).
(13) Burma cutch—wood of *Acacia catechu* (Leguminosae).
(14) Myrtan—wood, bark, leaves *Eucalyptus redunca* (Myraceae).
(15) Oak—bark of various Quercus species (Fagaceae).

There have been earlier suggestions that carbohydrates might be used to produce resinous compositions. It is known that cane sugar (sucrose) will condense with phenol to form a complex which can be made to cross-link with substances such as hexamethylenetetramine. (J. V. Meigs, British patent specification No. 274,146.) It is also known that sucrose will react with formaldehyde and can also be reacted with substances such as urea (A. S. Ford, U.S. patent specification No. 1,949,831), organic acids (U.S. patent specification No. 1,974,064) and phthallic anhydride (U.S. patent specification No. 1,949,832).

Tanning materials have also been used previously to prepare thermosetting compositions by reaction with formaldehyde and formaldehyde compounds, e.g. hexamethylenetetramine. British patent specification No. 481,819, British patent specification No. 539,581, British patent specification No. 545,147, British patent specification No. 520,913, but difficulties were experienced in flowability and the reaction depended upon the polyhydric phenol activity of the tanning materials. ("Tannin Extracts as Raw Materials for the Adhesive and Resin Industries." E. Knowles, B. Sc. and T. White, Ph. D., "Adhesives and Resins." Volume 2, Nos. 10 and 11, 1954.) It has also been previously stated in connection with tanning materials that hydrolysable tanning materials do not form plastic-like materials with formaldehyde, and are of no interest for resin productions.

It has now been found that members of the hydrolysable and the condensed tanning material produce similar resinous products although the physical properties of some of the compounds are markedly inferior to others.

The reaction has been found to take place with carbohydrate and carbohydrate containing materials, satisfactory resinous compositions having been produced from monosaccharides, such as glucose and fructose, disaccharides such as sucrose, and hydrolysed polysaccharides such as hydrolysed cellulose or starch and dextrins. Polysaccharides can be considered as complexes of mono and/or disaccharide units. It has been found necessary to hydrolyse the polysaccharides into mono- and di-saccharide units prior to the addition of the tannins to enable a satisfactory resinous composition to be formed. Dextrins have on the other hand been found to react with tanning materials without initial hydrolysis to give useful resinous compositions.

The reaction takes place in the presence of aniline or another amine which may be, for example, hexamethylene tetramine, anhydroformaldehyde aniline, the naphthylamines, thio carbanilamide, para-aminophenol, paraphenylene diamine, pyridine, urea, thiourea, isoamylamine, hydroxylamine or ammonia or a combination of any two or more of these amines. The proportion of said amine or amines should not exceed 15% by weight of the combined carbohydrate and tanning material.

The resinous product formed as a product of the reaction between carbohydrates (including carbohydrate forming materials) and suitable members of the tanning materials series can be used in many of the processes and products for which the usual types of thermosetting resins are customarily exployed.

Certain additives takes from one or more of the groups mentioned in the following lettered paragraphs may be added in order to improve the properties of the thermosetting composition.

(a) In order to reduce the tackiness and facilitate the grinding finely powdered material such as talc, stearates, clays and zinc oxide, or a mixture of two or more of these materials may be added in a proportion of up to 20% by weight of ground thermosetting composition.

(b) In order to improve the strength of products made by means of the thermosetting composition of the invention, there may be added to the composition known thermosetting substances, for example, phenol-formaldehyde condensates, urea formaldehyde condensates, silicone resins and melamine-aldehyde condensates. The exact quantity of these substances added can be varied within wide limits, but a satisfactory and economical product is obtained when the proportion added does not exceed 10% by weight of the thermosetting material.

(c) There may also be added small quantities of natural or synthetic thermoplastic materials in order to afford increased resiliency and resistance to thermal shock, in products made by means of the thermosetting composition. The amount added may be up to 10% by weight of the thermosetting material.

(d) Various modifying agents may be added which have the effect of facilitating the stripping of the moulded products from dies or patterns and when used for foundry purposes improve the coverage of the thermosetting binder over the surface of the grains of sand. Additives useful for these purposes include plumgago, talc, silicones and diatomaceous earth, and these may be added in proportions of up to 20% by weight of the thermosetting composition. Surface active agents may be added when it is required to improve coverage.

(e) In order to harden and strengthen products made by means of this thermosetting composition a variety of hardening agents may be added to the extent of up to 15% by weight of the thermosetting composition. Such hardeners may be acidic in character, typical examples include: sulphuric, phosphoric, chromic, hydrochloric, hydriodic, hydrobromic, lactic, acetic, formic, citric, oxalic, gallic, phthalic and salicylic acids and anhydrides.

(f) There may also be added to the compositions of the invention cross-linking agents, e.g. paraformaldehyde, polyoxymethylene derivatives, and formaldehyde compounds generally.

Thermosetting compositions, both solid and liquid, according to this invention may be used in the manufacture of plastic articles according to processes now known and used in making such articles. For this purpose these compositions may be used alone or together with wood meal, cotton linters, mica, asbestos, mineral powders and other fillers known and used in the plastics industry according to the nature of the article to be produced.

Thermosetting compositions both liquid and solid according to the invention can be made to foam by controlled heating and produce, on curing, rigid foams which can serve as excellent heat insulating materials, being substantially non inflammable at temperatures up to 900° C.

The thermosetting compositions both liquid and solid according to the invention can be used for bonding such materials as finely divided metals, fuels, micas, and other particulate materials, in such processes as the production of sintered products, coal briquittes and tiles.

The manufacture of articles from thermosetting materials is well known as it is explained in many textbooks. It is not proposed to explain here the methods used or the various fillers which are exployed either to dilute the thermosetting binder or to impart desirable qualities to the products obtained. It is sufficient to state that the thermosetting compositions of the present invention may be used in a similar manner.

As they have a sufficiently long resistance to decomposition by heat at the temperatures exployed in casting metals, these thermosetting compositions both solid and liquid have a special application in the manufacture of shell moulds and cores for foundry purposes.

As the technique of making shell moulds and cores is less well known, the following explanation of it and of the application of the thermosetting compositions of the present invention is given.

Shell moulds are usually made in parts, and then assembled to form the complete mould with, where necessary, the insertion of a core or cores. Shell cores (which may be used either in shell moulds or in other types of moulds) may also, though less frequently, be built up out of component parts. In what follows, for brevity, shell moulds and parts thereof and shell cores and parts thereof are referred to as shell moulds. The patterns or core boxes by means of which the shape of the shell moulds is determined are also for brevity herein referred to as patterns.

Shell moulds are made by applying either a moulding mixture comprising a granular refractory substance (usually sand) and a granular (or powdered) thermosetting binder, or a granular substance coated with a thermosetting binder, to a heated pattern. A proportion of the thermosetting binder may be replaced by a thermoplastic binder. The heat of the pattern causes the binder to soften and become adhesive, and a coating (or investment) of the refractory substance held together by the binder then adheres to the face of the pattern to which it is applied. In what follows the refractory substance will be referred to as sand, the mixture of refractory substance and binder as mould mixture, and the refractory substance coated with binder as coated sand.

It is not always convenient to apply to the heated pattern the exact quantity of mould mixture or of coated sand required to form the mould. In that case, more is applied than needed, and as soon as a coating of sufficient thickness has formed on and adhered to the pattern, the surplus is removed. The investment is then subjected to further heat (or curing) in order that it may develop sufficient strength and rigidity to permit its removal from the pattern and for subsequent handling and use. It is commonly the practice either to treat the pattern with a stripping agent, or to incorporate a stripping agent in the moulding mixture or the coated sand, to prevent the mould from adhering too tightly to the pattern, and to facilitate the safe removal of the mould from the pattern.

Desirable properties in a binder for making shell moulds are:

(a) That it should soften at a moderate temperature.

(b) That it should enable a sufficient coating to form on the pattern in a short period of time.

(c) That the coating should set rapidly on further heating.

(d) That the cured shell mould should not adhere too tightly to the pattern.

(e) That the shell mould should have sufficient strength to withstand handling.

(f) That the shell mould should be permeable to allow gases evolved during the casting process to pass readily through the mould.

(g) That the shell mould should withstand the impact and heat of the molten metal for a time sufficient for the metal to develop sufficient strength to support itself without distortion.

(h) That the heat of the casting should cause the binder to burn out so that the mould disintegrates and leaves the casting free of mould materials.

(i) That the binder (or coated sand) can be stored for reasonable periods of time without deterioration.

It will be understood also that the shell mould should conform closely to the contours of the pattern on which it is formed. The surface finish of shell moulded castings is dependent primarily upon the grain size and distribution of the sand used, but in general is superior to that obtained from conventional methods of producing castings.

Optionally, there may be included in the mould mixture up to 10% of finely divided substances, such as iron oxide, manganese oxide and silica flour, the purpose of which is to impart a smoother finish to the castings. In other cases, materials known generally as inhibiting agents of which typical examples are ammonium boro fluoride, boric acid, and sulphur may be added to the mix to prevent oxidation of the metal in the case of magnesium and magnesium based alloys. Desirable characteristics can also be contributed to or enhanced by the choice of the refractory material and of its particle size.

The mould mixtures or coated sands mentioned above have hitherto been prepared mainly from thermosetting resins such as phenol or cresol formaldehyde, urea formaldehyde and similar synthetic resins, either in liquid or solid form. Their disadvantages are such that considerable efforts have been made to substitute other substances in their place. In the first place the cost of the expendable synthetic resins is high and secondly, their use may occasion occupational risks.

The thermosetting compositions both solid and liquid, of the present invention can be used in the making of shell moulds in place of the binders presently used. In order to obtain a moulding mixture suitable for shell moulding the powdered binder is intimately mixed with the sand. The proportion of binder used will be similar to the proportion of phenol-formaldehyde resin currently employed, and will normally vary, according to requirements from 2–10% by weight of the sand.

Alternatively, a sand coated with the thermosetting compositions both solid and liquid of the present invention may be used. This may be carried out according to the processes at present in use for making resin coated sand.

To promote and maintain free-flowing qualities addition of up to 20% by weight of the thermosetting binder of the following substances, or a mixture of two or more of these materials may be added to the mould mixture or used in coating the same in the mill: zinc oxide, aluminium hydroxide, calcium oxide and hydroxide, halides, including sodium, magnesium ammonium and zinc chlorides, stearates, including stearates of calcium, zinc and aluminium, and carbonates, including carbonates, of magnesium, zinc and the alkali and alkaline earth metals, ammonium persulphate, manganese dioxide, potassium and sodium nitrates, and other inorganic oxidising agents, the isocyanates, sodium acetate and complex hydrated alumino silicates such as the montmorillonites.

It will be understood that in the making of shell moulds, the moulding mixture or coated sand used will be selected or blended by the foundryman so as to suit the particular kind of casting which he intends to make and so will have regard to the shape and size of the casting, the kind of finish required on its surface, the temperature of the molten metal employed, the degree of stress imparted to various parts of the mould during the casting process, the affinity of the metal in its molten state for any of the substances employed. These are practical matters which are well known in the trade, and which it would be supererogatory to explain in detail.

The invention will be further illustrated by the examples set forth below:

*Example 1*

100 parts of cane sugar molasses was heated together with 5.4 parts of aniline, 3.7 parts of sulphited quebracho extract and 3.7 parts of concentrated hydrochloric acid, in a vacuum type Z blade mixer at 80° C. until the physically contained water was substantially removed. 0.5 part of hexamethylene-tetramine was then added and after mixing for a suitable period the resultant product was allowed to cool and then mixed with 100 parts of commercial pine wood flour, capable of passing through a 100 mesh sieve. The moulding powder so produced was capable of being moulded in a flash type mould at a platen temperature of 240° C., under a pressure of about 2 tons per square inch, and will yield a black, hard product of good surface finish.

*Example 2*

100 parts of commercial pine wood flour (100 mesh) was intimately mixed with 200 parts of commercial dextrin, 20 parts of myrabolan extract, 20 parts of commercial aniline and 1.5 parts of hexamethylenetetramine. The resultant powder was moulded in a flash type mould, with a platen temperature of 240° C., under a pressure of 2 tons per square inch, and yielded a hard, dark brown product of good surface finish. The powder can also be used to make mould mixture and to coat refractory granular material.

*Example 3*

100 parts of commercial pine wood flour (100 mesh) was intimately mixed with 200 parts of commercial dextrose, 20 parts of myrabolan extract, 20 parts of commercial aniline and 1.5 parts of hexamethylenetetramine. The resultant powder was moulded in a flash type mould with a platen temperature of 240° C., under a pressure of 2 tons per square inch, and yielded a hard, black product of good surface finish. The powder can be used to make mould mixture and to coat refractory granular materials.

*Example 4*

100 parts of commercial pine wood flour (100 mesh) was intimately mixed with 200 parts of a thin boiling starch, 20 parts of quebracho extract, 20 parts of aniline and 2 parts of hexamethylenetetramine. The resultant powder was moulded in a flash type mould with a platen temperature of 240° C., under a pressure of 2 tons per square inch and yielded a hard, black product of good surface finish. The powder can also be used to make mould mixture and to coat refractory granular material.

*Example 5*

100 parts of cane sugar molasses was mixed with 5.4 parts of aniline, 3.7 parts of sulphited quebracho extract and 3.7 parts of concentrated hydrochloric acid and was heated in a vacuum type Z blade mixer at 80° C., until the physically contained water was substantially removed. The resultant mass was then heated in the absence of pressure at 250° C. to produce a material which on cooling resulted in a hard brittle foam which was an excellent heat insulator and was substantially non-inflammable at temperatures up to 900° C.

*Example 6*

112 pounds of quartz sand was heated to a temperature of 120° C. in a vane type mixer. 10 pounds of molasses was heated to a temperature of 104° C. and to the hot syrup 250 mls. of aniline, 6 ozs. sulphited quebracho extract and 100 mls. of concentrated hydrochloric acid were added and stirred in. The syrup cooled to a temperature of 88° C. and was then added to the mixer. The cooled agglomerate was broken down in a roller type mill to make a suitable mould forming material in the shell moulding process.

*Example 7*

Coated sand was prepared as in Example 6, but to the coated sand in the roller mill was added 8 ozs. of a fatty acid pitch dissolved in carbon tetrachloride. The action of mixing coated the pitch round the previously coated sand, and caused the solvent to evaporate, leaving a freely flowable coated sand.

*Example 8*

112 pounds of quartz sand was heated to 120° C. in a vane type mixer. 6 pounds of cane sugar (sucrose) was dissolved in ½ gallon of water and the solution heated to near boiling point. To the solution 6 ozs. of sulphited quebracho extract, 250 mls. aniline, and 100 mls. of concentrated hydrochloric acid were then added. The solution was added to the heated sand at a temperature of 88° C. and mixing continued for 10 minutes. After discharge and cooling, the agglomerate was broken down in a roller type mill but an addition was made in the mill of 11 gms. of hexamethyleneteteramine that had previously been intimately mixed with 2 ozs. of zinc stearate. The product was a coated sand that could be used to produce satisfactory shell moulds.

Example 9

112 pounds of quartz sand was heated to 120° C. in a vane type mixer. 10 pounds of molasses was heated to 104° C. and 150 mls. of aniline, 100 mls. of concentrated hydrochloric acid and 6 ozs. of sulphited quebracho extract stirred into the syrup. The syrup was added to the mixer at a temperature of 85° C. and mixing continued for 12 minutes. The agglomerate was cooled and broken down in the manner described in previous examples, but in addition 4 ozs. of an uncured novolac resin was added and mixed into the coated sand together with 12 ozs. of Wyoming bentonite. When thoroughly mixed the coated sand was discharged and used to prepare moulds in the shell moulding process as hereinbefore described.

Example 10

10 pounds of molasses was heated to a temperature of 104° C. and to the hot liquid 250 mls. of aniline, 7 ozs. of sulphited quebracho extract, and 100 mls. of concentrated hydrochloric acid were added and stirred in. The resultant liquid was allowed to cool as soon as all ingredients were thoroughly mixed and was capable of being stored before finally adding in the required proportions to a dry heated filler or a dry heated granular refractory material. The addition to the dry heated filler or dry refractory material resulted in further heating of the liquid and substantially complete dehydration of the latter.

We claim:

1. A thermosetting composition consisting of a carbohydrate selected from the group of compounds consisting of monosaccharides, disaccharides, hydrolysed polysaccharides, substituted compounds of the foregoing and polyhydroxy alcohols containing at least 3 carbon atoms, a member selected from the group of chemical extracts and physically disintegrated powders of certain woods, used for tanning leather and commonly referred to as tanning materials, the proportion of said tanning material not exceeding 25% by weight of said carbohydrate, and a compound containing a tri-valent nitrogen, selected from the group consisting of hexamethylene tetramine, anhydroformaldehyde aniline, the naphthyl-amines, thio carbanilamide, para-aminophenol, paraphenylene diamine, pyridine, urea, thiourea, isoamylamine, hydroxylamine, ammonia, aniline, melamine, and a combination thereof, the proportion of said nitrogen compound not exceeding 15% by weight of the combined tanning material and carbohydrate.

2. A composition as claimed in claim 1, which additionally includes a tackiness reducing agent selected from the group consisting of talc, calcium and zinc stearates, clays and zinc oxide, the proportion of said agent not exceeding 20% by weight of said composition.

3. A composition as claimed in claim 1, which additionally includes a strengthening agent selected from the group consisting of phenol formaldehyde condensates, urea formaldehyde condensates, silicone resins and melamine aldehyde condensates, the proportion of said agent not exceeding 10% by weight of said composition.

4. A composition as claimed in claim 1, which additionally includes an agent which increases resiliency and resistance to thermal shock, said agent being selected from the group consisting of natural and synthetic thermoplastic materials and being present in a proportion of at most 10% by weight of said composition.

5. A composition as claimed in claim 1, which additionally includes an acidic hardening agent selected from the group consisting of sulphuric, phosphoric, chromic, hydrochloric, hydriodic, hydrobromic, lactic, acetic, formic, citric, oxalic, gallic, phthalic and salicylic acids and the anhydrides thereof, the proportion of said hardening agent not exceeding 15% by weight of said composition.

6. A composition as claimed in claim 1, which additionally includes a cross-linking agent selected from the group of formaldehyde compound cross-linking agents, the proportion of said cross-linking agent not exceeding 15% by weight of the composition.

7. A shell moulding material consisting of a thermosetting composition obtained by reaction of a carbohydrate selected from the group of compounds consisting of monosaccharides, disaccharides, hydrolysed polysaccharides, substituted compounds of the foregoing and polyhydroxy alcohols containing at least 3 carbon atoms, with a member selected from the group of chemical extracts and physically disintegrated powders of certain woods, used for tanning leather and commonly referred to as tanning materials, in the presence of a compound containing a tri-valent nitrogen, selected from the group consisting of hexamethylene, tetramine, amide, para-aminophenol, paraphenylene diamine, pyridine, urea, thiourea, isoamylamine, hydroxylamine, ammonia, aniline, melamine, and a combination thereof the proportion of said tanning material not exceeding 25% by weight of said carbohydrate and the proportion of said nitrogen compound not exceeding 15% of the combined weight of said carbohydrate and said tanning material, and a dry granular refractory material.

8. A shell moulding material as claimed in claim 7, which additionally includes a tackiness reducing agent selected from the group consisting of talc, calcium and zinc stearates, clays and zinc oxide, the proportion of said agent not exceeding 20% by weight of said composition.

9. A shell moulding material as claimed in claim 7, which additionally includes a strengthening agent selected from the group consisting of phenol formaldehyde condensates, urea formaldehyde condensates, silicone resins and melamine aldehyde condensates, the proportion of said agent not exceeding 10% by weight of said composition.

10. A shell moulding material as claimed in claim 7, which additionally includes an agent which increases resiliency and resistance to thermal shock, said agent being selected from the group consisting of natural and synthetic thermoplastic materials and being present in a proportion of at most 10% by weight of said composition.

11. A shell moulding material as claimed in claim 7, which additionally includes an acidic hardening agent selected from the group consisting of sulphuric, phosphoric, chromic, hydrochloric, hydriodic, hydrobromic, lactic, acetic, formic, citric, oxalic, gallic, phthalic and salicylic acids and the anhydrides thereof, the proportion of said hardening agent not exceeding 15% by weight of said composition.

12. A shell moulding material as claimed in claim 7, which additionally includes a cross-linking agent selected from the group of formaldehyde compound cross-linking agents, the proportion of said cross-linking agent not exceeding 15% by weight of the composition.

13. A shell moulding material consisting of a dry granular refractory material, the grains of which are coated with a thermosetting composition obtained from a reaction between a carbohydrate selected from the group of compounds consisting of monosaccharides, disaccharides, hydrolysed polysaccharides, substituted compounds of the foregoing and polyhydroxy alcohols containing at least 3 carbon atoms, and a member selected from the group of chemical extracts and physically disintegrated powders of certain woods, used for tanning leather and commonly known as tanning materials, in the presence of a compound containing a tri-valent nitrogen, selected from the group consisting of hexamethylene tetramine, anhydroformaldehyde aniline, the naphthyl-amines, thio carbanilamide, para-aminophenol, paraphenylene diamine, pyridine, urea, thiourea, isoamylamine, hydroxylamine, ammonia, aniline, melamine, and a combination thereof, the proportion of the tanning material not exceeding 25% by weight of the carbohydrate and the proportion of said nitrogen compound not exceeding 15% by weight of the combined tanning material and carbohydrate.

14. A shell moulding material as claimed in claim 13, in which the thermosetting composition additionally includes a tackiness reducing agent selected from the group consisting of talc, calcium and zinc stearates, clays and zinc oxide, the proportion of said agent not exceeding 20% by weight of said composition.

15. A shell moulding material as claimed in claim 13, in which the thermosetting composition additionally includes a strengthening agent selected from the group consisting of phenol formaldehyde condensates, urea formaldehyde condensates, silicone resins and melamine aldehyde condensates, the proportion of said agent not exceeding 10% by weight of said composition.

16. A shell moulding material as claimed in claim 13, in which the thermosetting composition additionally includes an agent which increases resiliency and resistance to thermal shock, said agent being selected from the group consisting of natural and synthetic thermoplastic materials and being present in a proportion of at most 10% by weight of said composition.

17. A shell moulding material as claimed in claim 13, in which the thermosetting composition additionally includes an acidic hardening agent selected from the group consisting of sulphuric, phosphoric, chromic, hydrochloric, hydriodic, hydrobromic, lactic, acetic, formic, citric, oxalic, gallic, phthalic and salicylic acids and the anhydrides thereof, the proportion of said hardening agent not exceeding 15% by weight of said composition.

18. A shell moulding material as claimed in claim 13, in which the thermosetting composition additionally includes a cross-linking agent selected from the group of formaldehyde compound cross-linking agents, the proportion of said cross-linking agent not exceeding 15% by weight of the composition.

19. A method of making a shell moulding material, which comprises adding to and mixing with heated dry granular refractory material, a carbohydrate selected from the group of compounds consisting of monosaccharides, disaccharides, hydrolysed polysaccharides, substituted compounds of the foregoing and polyhydroxyl alcohols containing at least 3 carbon atoms, a compound selected from the group of chemical extracts and physically disintegrated powders of certain woods, used for tanning leather and commonly referred to as tanning materials, and a compound containing a tri-valent nitrogen, selected from the group consisting of hexamethylene tetramine, anhydroformaldehyde aniline, the naphthyl-amines, thio carbanilamide, para-aminophenol, paraphenylene diamine, pyridine, urea, thiourea, isoamylamine, hydroxylamine, ammonia, aniline, melamine, and a combination thereof, the heat of the refractory material causing the other materials to react together to form a thermosetting composition, and then grinding the resultant product to a suitable grain size, the proportion of the carbohydrate to the refractory material not exceeding 10% by weight, the proportion of the tanning material to the carbohydrate not exceeding 25% by weight and the proportion of the said nitrogen compound not exceeding 15% by weight of the combined tanning material and carbohydrate.

20. A method of making a shell moulding material as claimed in claim 19, wherein there is additionally incorporated a tackiness reducing agent selected from the group consisting of talc, calcium and zinc stearates, clays and zinc oxide, the proportion of said agent not exceeding 20% by weight of said composition.

21. A method of making a shell moulding material as claimed in claim 19, wherein there is additionally incorporated a strengthening agent selected from the group consisting of phenol formaldehyde condensates, urea formaldehyde condensates, silicone resins and melamine aldehyde condensates, the proportion of said agent not exceeding 10% by weight of said composition.

22. A method of making a shell moulding material as claimed in claim 19, wherein there is additionally incorporated an agent which increases resiliency and resistance to thermal shock, said agent being selected from the group consisting of natural and synthetic thermoplastic materials and being present in a proportion of at most 10% by weight of said composition.

23. A method of making a shell moulding material as claimed in claim 19, wherein there is additionally incorporated an acidic hardening agent selected from the group consisting of sulphuric, phosphoric, chromic, hydrochloric, hydriodic, hydrobromic, lactic, acetic, formic, citric, oxalic, gallic, phthalic and salicylic acids, and the anhydrides thereof, the proportion of said hardening agent not exceeding 15% by weight of said composition.

24. A method of making shell moulding material as claimed in claim 19, wherein there is additionally incorporated a cross-linking agent selected from the group of formaldehyde compound cross-linking agents, the proportion of said cross-linking agent not exceeding 15% by weight of the composition.

References Cited in the file of this patent

UNITED STATES PATENTS

| | | |
|---|---|---|
| 2,215,825 | Wallace et al. | Sept. 24, 1940 |
| 2,440,789 | Van der Pyl | May 4, 1948 |
| 2,549,822 | Koonee | Apr. 24, 1951 |
| 2,574,803 | Van Beckum et al. | Nov. 13, 1951 |
| 2,676,108 | Fuller et al. | Apr. 20, 1954 |
| 2,744,024 | Farber | May 1, 1956 |
| 2,988,453 | Hoglan et al. | June 13, 1961 |

FOREIGN PATENTS

| | | |
|---|---|---|
| 222,513 | Germany | Mar. 31, 1909 |
| 335,806 | Switzerland | Mar. 14, 1959 |
| 770,561 | Great Britain | Mar. 20, 1957 |
| 1,052,425 | France | Jan. 25, 1954 |